United States Patent
Hartman et al.

(10) Patent No.: US 11,866,366 B2
(45) Date of Patent: Jan. 9, 2024

(54) WEAR-RESISTANT CONCRETE FORMULATIONS AND METHODS FOR THEIR PREPARATION

(71) Applicant: Specification Products, Inc., Noblesville, IN (US)

(72) Inventors: Dustin A. Hartman, Boggstown, IN (US); William Archie Joseph Shetterley, Fortville, IN (US); Christopher F. Wolf, Carmel, IN (US)

(73) Assignee: Specification Products, Inc., Noblesville, IN (US)

( * ) Notice: Subject to any disclaimer, the term of this patent is extended or adjusted under 35 U.S.C. 154(b) by 166 days.

(21) Appl. No.: 16/602,272

(22) Filed: Sep. 3, 2019

(65) Prior Publication Data

US 2021/0061708 A1  Mar. 4, 2021

(51) Int. Cl.

| | |
|---|---|
| *C04B 14/06* | (2006.01) |
| *E04F 15/12* | (2006.01) |
| *E01C 19/00* | (2006.01) |
| *C04B 40/00* | (2006.01) |
| *C04B 103/00* | (2006.01) |
| *C04B 111/27* | (2006.01) |
| *C04B 111/00* | (2006.01) |
| *C04B 111/60* | (2006.01) |

(52) U.S. Cl.
CPC ............ *C04B 14/062* (2013.01); *C04B 14/06* (2013.01); *C04B 40/0032* (2013.01); *C04B 40/0039* (2013.01); *E01C 19/002* (2013.01); *E04F 15/12* (2013.01); *C04B 2103/0029* (2013.01); *C04B 2111/00008* (2013.01); *C04B 2111/27* (2013.01); *C04B 2111/60* (2013.01)

(58) Field of Classification Search
CPC ... C04B 14/06; C04B 14/062; C04B 40/0032; C04B 40/0039; C04B 2103/0029; C04B 2111/00008; C04B 2111/27; C04B 2111/60; E01C 19/002; E04F 15/12
See application file for complete search history.

(56) References Cited

U.S. PATENT DOCUMENTS

| | | |
|---|---|---|
| 4,144,086 A | 3/1979 | Helgesson |
| 4,495,228 A | 1/1985 | Cornwell |
| 4,640,715 A | 2/1987 | Heitzmann |
| 4,804,563 A | 2/1989 | Hillemeier |
| 4,940,348 A | 7/1990 | Akers et al. |
| 5,149,370 A | 9/1992 | Olaussen et al. |
| 5,352,288 A | 10/1994 | Mallow |
| 5,472,501 A | 12/1995 | Dastol |
| 5,554,352 A | 9/1996 | Jaques |
| 5,843,216 A | 12/1998 | Dastol |
| 6,251,180 B1 | 6/2001 | Engstrand |
| 6,372,694 B1 | 4/2002 | Osinga |
| 6,387,173 B2 | 5/2002 | Greenwood |
| 6,765,153 B2 | 7/2004 | Goodson |
| 6,855,200 B2 | 2/2005 | De Marco |
| 7,021,380 B2 | 4/2006 | Caveny et al. |
| 7,073,585 B2 | 7/2006 | Morgan et al. |
| 7,238,733 B2 | 7/2007 | Vijn et al. |
| 7,393,407 B2 | 7/2008 | Dingsoyr |
| 7,617,870 B1 | 11/2009 | Roddy |
| 8,048,219 B2 | 11/2011 | Woolfsmith |
| 8,147,609 B2 | 4/2012 | Jau |
| 8,172,938 B2 | 5/2012 | Alright |
| 8,177,930 B2 | 5/2012 | Chanvillard |
| 8,585,819 B2 | 11/2013 | Al-Bagoury |
| 8,598,093 B2 | 12/2013 | Roddy |
| 8,653,186 B2 | 2/2014 | Nicoleau |
| 8,685,903 B2 | 4/2014 | Ravi |
| 8,858,703 B1 | 10/2014 | Dongell |
| 9,186,697 B2 | 11/2015 | Bonin |
| 9,512,351 B2 | 12/2016 | Roddy et al. |
| 9,630,880 B2 | 4/2017 | Alhozaimy |
| 9,670,096 B1 | 6/2017 | Zubrod |
| 9,765,252 B2 | 9/2017 | Roddy et al. |
| 9,878,949 B2 | 1/2018 | Posklak et al. |
| 2002/0014187 A1* | 2/2002 | Greenwood ............ C04B 28/02 106/737 |
| 2005/0000178 A1 | 1/2005 | Rodgers et al. |
| 2006/0086503 A1 | 4/2006 | Reddy |
| 2007/0266906 A1 | 11/2007 | Garcia |
| 2010/0285224 A1 | 11/2010 | Fisher |
| 2011/0083585 A1 | 4/2011 | Fonollosa |
| 2013/0319294 A1 | 12/2013 | Gehrig |
| 2015/0038389 A1 | 2/2015 | De Wit et al. |
| 2015/0299041 A1 | 10/2015 | Wetherell et al. |
| 2016/0176758 A1 | 6/2016 | Muller et al. |
| 2016/0244375 A1 | 8/2016 | Maier |
| 2016/0272542 A1 | 9/2016 | Monkman et al. |
| 2017/0321104 A1 | 11/2017 | Ravi et al. |
| 2017/0334089 A1 | 11/2017 | Rieder et al. |
| 2018/0244575 A1 | 8/2018 | Fernandez Lozano et al. |

FOREIGN PATENT DOCUMENTS

| | | |
|---|---|---|
| DE | 4203476 A1 | 4/1993 |
| EP | 0858981 A1 | 8/1998 |
| JP | 2003-534227 A | 11/2003 |
| JP | 2007-197308 A | 8/2007 |
| JP | 2009-073698 A1 | 4/2009 |
| JP | 2011-144078 A | 7/2011 |
| WO | 91/03437 | 3/1991 |
| WO | 91/06513 A1 | 5/1991 |
| WO | 1998/012149 A1 | 3/1998 |
| WO | 2013/151439 A1 | 10/2013 |

(Continued)

OTHER PUBLICATIONS

Jonathan Samuel Belkowitz, The Investigation of Nano Silica in the Cement Hydration Pro, Research Thesis, Jan. 1, 2009, University of Denver, https://digitalcommons.du.edu/etd/761/.

(Continued)

*Primary Examiner* — Anthony J Green
(74) *Attorney, Agent, or Firm* — Reichel Stohry Dean LLP; Mark C. Reichel; Natalie J. Dean

(57) ABSTRACT

A method for the preparation of concretes with improved wear resistance. The method involves the use of colloidal silica, which is added to a concrete mixture after mixing, in conjunction with a concrete cutter, which is added to the concrete mixture after the addition of the colloidal silica.

15 Claims, No Drawings

(56) References Cited

FOREIGN PATENT DOCUMENTS

| WO | 2016/081080 A1 | 5/2016 | |
| WO | WO-2016081080 A1 * | 5/2016 | ............. C04B 14/04 |

OTHER PUBLICATIONS

Du et al., "Durability performances of concrete with nano-silica," Construction and Building Materials, (2014), Issue 73, pp. 705-712.

Hsie et al., "Mechanical properties of polypropylene hybrid fiber-reinforced concrete," Materials Science and Engineering A., (2008), Issue 494, pp. 153-157.

GCP Applied Technologies Inc., "Admixture Dispenser Discharge Line Location and Sequencing for Concrete Batching Operations," Tech Bulletin, (2016), pp. 1-3.

Madandoust et al., "Fresh and hardened properties of self-compacting concrete containing metakaolin," Construction and Building Materials, (2012), Issue 35, pp. 752-760.

Brand et al., "Initial moisture and mixing effects on higher quality recycled coarse aggregate concrete," Construction and Building Materials, (2015), Issue 79, pp. 83-89.

Japanese Patent Office, Notice of Reasons for Refusal, Japanese Patent Application Serial No. 2020-570392, dated Mar. 28, 2023.

Japanese Patent Office, Notice of Reasons for Refusal, Japanese Patent Application Serial No. 2021-500779, dated Mar. 28, 2023.

Intellectual Property India, Examination Report, Indian Patent Application Serial No. 2020-17043947, dated May 4, 2022.

Intellectual Property India, Examination Report, Indian Patent Application Serial No. 2021-27008274, dated Sep. 16, 2022.

International Searching Authority, International Search Report, PCT/US2019/000009, dated Aug. 19, 2019.

International Searching Authority, Written Opinion of the International Searching Authority, PCT/US2019/000009, dated Aug. 19, 2019.

International Searching Authority, International Search Report, PCT/US2019/000043, dated Mar. 26, 2020.

International Searching Authority, Written Opinion of the International Searching Authority, PCT/US2019/000043, dated Mar. 26, 2020.

International Searching Authority, International Search Report, PCT/US2019/000013, dated Aug. 22, 2019.

International Searching Authority, Written Opinion of the International Searching Authority, PCT/US2019/000013, dated Aug. 22, 2019.

* cited by examiner

WEAR-RESISTANT CONCRETE FORMULATIONS AND METHODS FOR THEIR PREPARATION

PRIORITY CLAIM

This application claims priority to Provisional Application 62/765,597, filed on Sep. 1, 2018, and incorporated by reference in its entirety for all that it teaches without exclusion.

The use of additional cementitious materials in concrete to improve concrete properties, such as, for example, water impermeability, compressive strength and abrasion resistance, is well-known. Various types of particulate silica, such as, for example silica fume, have been used in concrete as additional cementitious materials to improve water-impermeability and compressive strength. A general problem with silica is that it can raise the water demand of a concrete formulation such that the likelihood of capillaries and void formation during curing is increased due to the higher likelihood of significant bleedwater. In order to reduce bleed water, water is commonly minimized, even when relatively large amounts of silica fume are used (often 5 to 10 percent by weight of cementitious materials). Water is often carefully rationed to be present in relative amounts below a water: cementitious materials ratio of about 0.5. (Design and Control of Concrete Mixtures, Sixteenth Edition, Second Printing (revised); Kosmatka, Steven H.; page 156). Such low amounts of water are generally below what is recommended by the cement manufacturer, and can significantly impair the rheology of the concrete mix, causing it to be difficult to pour or work. Materials such as superplasticizers can be necessary at such low water content.

In earlier-filed application (application Ser. No. 16/501, 232 filed on Mar. 8, 2019, incorporated by reference for all that it teaches, without exclusion), a concrete and method of preparation is disclosed which comprises small-particle-size, high-surface-area amorphous silica, used in much smaller proportions to the cement than generally used in the industry for structural purposes: only about 0.1 to about 4 ounces per hundred weight of cementitious materials. In an additional aspect, the improved concretes are prepared by a process-specific addition of the silica. These improved concretes can be prepared using the standard amount of water recommended by the cement manufacturer, or even water in excess of the recommended amount, without significantly compromising compressive strength. Such a result is truly surprising. Despite the use of such water amounts, little or no bleedwater is observed during curing. The formation of capillaries and voids is minimal or even essentially completely suppressed, and more water is retained in the concrete during curing, allowing more water to participate in curing over an extended period of time, and compressive strength is greatly improved.

Despite their allowance for relatively high amounts of water, the low-silica concretes described above have improved compressive strength and abrasion resistance, among other improved characteristics. An improvement in compressive strength is surprising, considering the small amounts of silica employed, while known methods use much larger amounts to achieve gains which are, in some cases, significantly less. Furthermore, significant improvement in concrete abrasion resistance has generally not been observed with the use of silicas such as, for example, silica fume, even in the larger amounts usually used. (Id, page 159). The low-silica concretes, described in the foregoing application (U.S. Provisional Application 62/761,064), give profound improvement in abrasion resistance as measured by test ASTM C944. (Note that with regard to the foregoing standard, the version employing a 22 pd, 98 kg load was used in all references to the standard herein.) Standard concretes (i.e., not comprising the high-surface-area amorphous silica taught infra) can have a value of in the range of from about 2.5 to about 4.0 grams of loss. The low-silica concretes taught herein can have an ASTM C944 value is as low as 1.1 grams of loss or less.

Surprisingly, in the case of the present invention, it has been found that the use of both 1) amorphous silica, as disclosed in the above-indicated application; as well as 2) the admixture use of a mixture comprising, counterintuitively, a concrete re-emulsifier (cutting agent), as disclosed infra, can improve wear-resistance even with respect to cement which has been prepared with the amorphous silica alone, let alone with respect to typical cement (i.e., cement which has been prepared with neither amorphous silica nor cutting agent). It has been discovered that abrasion resistance can be improved such that the ASTM C944 loss can be as low as 0.6 grams or even lower. Furthermore, it has been observed that the concrete of the present invention generally exhibits a greatly reduced absorption of water-both during and after curing. (Absorption of finishing water, during curing, as well as in-use absorption of water, i.e., after curing, is largely a result of capillary formation during curing, due to water migrating to the surface during curing.) In some cases, the absorption of water during curing and/or after curing can be eliminated completely. Such a result is unexpected in that the admixture comprises a compound commonly used to re-emulsify concrete. The concrete cutter has been used in the concrete industry to dissolve hardened (i.e., cured) concrete deposits from equipment used to prepare and work concrete, such as Readymixes, power trowels, and the like. The presence of a re-emulsifier, which has the ability to destroy the structure (C-S-H matrix) of cured concrete, could be expected to thin the concrete mix, preventing curing, or negatively affecting the cured structure of the concrete by permitting the migration of water during curing. However, when used in conjunction with the silica as described infra, the concrete not only cures, but little or no bleed water is generally observed during curing of concrete of the present invention. Moreover, as indicated above, the cured concrete has a better abrasion resistance than even the concrete prepared with the silica admixture alone, let alone traditional concretes.

Unexpectedly, the high degree of water impermeability can be obtained without subjecting the concrete to a finishing step (See Example 2, for example, which describes the preparation of a footing which shows density and impermeability). Thus, the concrete of the present invention is particularly appropriate for outdoor concrete applications. In general, concrete for outside use, such as, for example, sidewalks, curbs, and parking lots, does not require extensive finishing, although some degree of floating may be performed. The small imperfections in the surface are generally allowed to remain, and eventually the surface weathers and renders the issue of imperfections moot. However, water damage during the life of the concrete is a problem with outside concrete. One countermeasure taken is the application of a cure and seal agent. The protection given by these agents is generally short-lived. Another countermeasure is the use of air-entrained concrete such that the damage done by absorbed water during freezing is minimized. In practice, neither measure is a long-term solution to the problem of freeze damage. However, cured concrete of the present invention generally has a negligible or no water absorption. No further finishing or sealant application is necessary. Furthermore, the concrete thus generally does not require the entrainment of air in order to resist freeze-thaw damage.

The normal water absorption of outdoor cement according to the Rilum test is about 1.5 to 3 ml in 20 minutes. The surfaces of the concrete of the present invention absorbed essentially no water, despite the lack of a finishing step. For example, the Rilum test is expected to give an absorption in 20 minutes of from about 0 to about 1.0 ml in 20 minutes. Without desiring to be bound by theory, it is surmised that concretes of the present invention may not develop the surface imperfections and capillaries which are an issue with other concretes, or the inventive concretes may develop them to a greatly reduced degree.

More remarkably, when the concrete of the present invention is subjected to finishing, the surface which develops can be plastic-like (the extent of which can be controlled by details of the finishing process, as discussed infra) having a greatly reduced amount of friction with respect to the finishing blades, when compared to the finishing of standard concrete. Increased finishing speeds with respect to standard concrete finishing speeds generally further the achievement of a glossy surface having a plastic-like consistency.

In general, finishing concrete prepared by existing methods and formulations improves the smoothness and planarity of the surface, with longer finishing times giving greater improvement, to a point. Such concrete can be finished by hand or with a ride-on power trowel, with ride on power trowel generally giving a faster, more even, higher quality finish than a hand trowel. However, regardless of the finishing method selected, the concretes of the present invention generally finish faster (i.e., take a shorter time to reach a given degree of glossiness) and have a higher glossiness potential (as measured, for example, with a glossiness meter) with regard to the finishing process. Referring to the latter, the use of higher-than-conventional speeds (particularly once the surface has reached a point where the lower speeds have essentially stopped giving gains in glossiness) can be expected to result in gains in glossiness beyond that possible with existing concretes.

Such high finishing speeds are generally easier to use with the concretes of the present invention due to reduced friction. Furthermore, all through the finishing process, the admixture as indicated herein generally gives a concrete which requires less finishing effort to achieve a finished surface. Regardless of whether the finisher is working with a hand trowel or a ride on power trowel, the finisher can generally feel a difference in that the friction between the trowel or finishing blades, and the floor surface is generally significantly less than it would be without the admixture use of the present invention. In general, the amount of time needed to finish a floor surface with a finishing machine to a given degree of glossiness is reduced for a given finishing machine speed (rpm). Furthermore, although it may require higher finishing speeds (from about 190-210 rpm) than are usually used in finishing (about 130 to about 190 rpm), the surface can generally be finished to a higher gloss than traditional concrete surfaces. Within the industry, it is apparently thought that higher finishing speeds are not necessary, and thus, newer finishing machines are capable of lesser top speeds (180 rpm or 190 rpm) than older machines (200 rpm or 210 rpm). Thus, it may be necessary to use an older model machine to achieve the superior surface available with the concretes of the present invention.

Without desiring to be bound by theory, is thought that the heat of curing promotes a reaction between the high surface area amorphous silica and the components of the "re-emulsifier" admixture to form a plastic-like component throughout the concrete. Finishing at high speeds promotes this reaction at the surface, where heat dissipation may prevent the reaction from taking place to the degree in the concrete bulk. Without desiring to be bound by theory, it is thought that the formation of the plastic-like substance, promoted by the heat generated by finishing at high finishing speeds (i.e., generally 200 rpm and above), gives the surface having an improved gloss with respect to that possible with traditional concretes.

It should be noted that in the art, the finishing of concrete surfaces can have an effect upon the water-impermeability of the slab. "Closing the slab," i.e., finishing a slab using a technique involving the repetitive, directional application of finishing machinery, well-known in the art, is a method of finishing which can give a decrease in water permeability. Such methods can be applied to concretes of the present invention, however, the concretes of the present invention exhibit surprisingly high water impermeability, or even complete water impermeability even without a finishing step.

It should also be noted that the surfaces of the concrete of the present invention are generally harder than concrete of traditional methods and formulations. In general, most concretes increase in hardness with curing times. For example, at about 28 days post-pour, most concretes prepared according to existing methods have a hardness in the range of from about 4 to about 5 with respect to the Mohs hardness scratch test. It is not unusual for the concretes of the present invention to achieve such a hardness after time lengths in the range of from about 3 to about 8 days (about 72 to about 192 hours) post-pour. After about 28 days, it is not unusual for concretes of the present invention to have a hardness in the range of from about 6 to about 9, or in many cases, to have a hardness in the range of from about 7 to about 8.

The methods of the present invention are preferably used as admixture with the concrete formulations comprising amorphous silica (such concrete formulations prepared as described in the section below entitled "Novel Compositions for Improved Concrete Performance"). The admixture use with the composition of the aforementioned section is described herein, its manner of use in these formulations thoroughly described. Without desiring to be bound by theory, the use of silica which is not described herein, such as having larger particle sizes than described herein, may give some limited benefits of the invention, but will likely be more difficult to pour, work and finish than concretes prepared with low-particle size, high-surface-area amorphous silica.

DETAILED DESCRIPTION OF THE INVENTION

The following is a detailed description of the admixture formulations which can be used in the present invention. While the invention disclosed in this provisional application refers to Korkay Concrete Dissolver ("Korkay") of the formulation available for sale on Mar. 20, 2017, from Tate's Soaps and Surfactants, one of skill in the art will recognize that Korkay, and water dilutions thereof, are chemical formulations, and such chemical formulations can be prepared by various different sources and/or methods and be suitable for use in the present invention, in order to obtain the benefits of the present invention. In one embodiment, the admixture composition comprises or consists essentially of a water dilution of Korkay.

It should be recognized that formulations comprising the same chemical components of Korkay or water dilutions thereof, but in which the concentrations of one or more components, not including water, deviate from the concentration with respect to Korkay or a water dilution thereof, respectively, by less than 50, 40, 30, 20, 10 or 5% by weight, with respect to the weight of Korkay or its water dilutions, respectively, can be useful in the present invention. Such chemical compositions can be used in the recommended amounts and rates above.

In additional embodiments, the admixture comprises or consists essentially of water, an alpha-hydroxy acid, a glycol alkyl ether, and a polyethylene glycol with an average molecular weight in the range of from about 500 to about 1500 mw. In further embodiments, the alpha-hydroxy acid contains in the range of from about 5 to about 1 carbons, with glycolic acid preferred. Glycolic acid is available from Chemsolv. The glycol alkyl ether is preferably a polypropylene methyl ether, with dipropylene glycol methyl ether preferred. Dipropylene glycol methyl ether is available from many sources, for example, Dow Chemical, Lyondell Bassell, and Shell. The polyethylene glycol having an average molecular weight in the range of from about 500 to about 1500 molecular weight is preferably polyethylene glycol having an average molecular weight in the range of from about 750 to about 1250 molecular weight, and even more preferably in the range of from about 950 to about 1050 molecular weight. One example of a suitable polyethylene glycol is PEG(1000).

In additional embodiments, the alpha-hydroxy acid is preferably present in the admixture in the range of from about 5 to about 20 weight percent, with a weight percent in the range of from about 10 to about 15 weight percent more preferred. The weight percent of glycol alkyl ether is preferably in the range of from about 5 to about 20 weight percent, with a range of about 10 to about 15 weight percent more preferred. The weight percent of polyethylene glycol is preferably in the range of from about 1 to about 15 weight percent, with a ration in the range of from about 1 to about 9 weight percent more preferred. Water is present in the range of from about 70 to about 80 weight percent, with a range of about 71 to about 77 weight percent more preferred.

In further embodiments, the admixture comprises, consists or consists essentially of a water dilution of the following four part mixture:
1) 74% water,
2) 13% glycolic acid;
3) 8% dipropylene glycol methyl ether (DPM glycol ether);
4) 5% polyethylene glycol (PEG 1000 type);

wherein the dilution is preferably comprises, consists, or consists essentially of one part mixture to between about 4 and about 20 parts of water, with a more preferred dilution of between about 5 and about 12 parts water, with an even more preferred dilution being from about 6 to about 8 parts of water, with a range of from about 6.5 to about 7.5, or even from about 6.8 to about 7.2 being particularly suitable. The component equivalent of such a dilution; whereby "component equivalent," it is meant that the admixture comprises, consists, or consists essentially of the same components and relative proportions as the foregoing, but the admixture was not prepared by the prescribed dilution.

In other embodiments, the admixture to be added to the concrete mix (such as, for example, adding to a Readymix which contains a concrete mixture, prepared by and comprising amorphous silica in amounts as described in U.S. Provisional application 62/765,597 or as otherwise enumerated herein) comprises, consists or consists essentially of one part by weight Korkay to between about 4 and about 20 parts by weight of water, with a more preferred dilution of between about 5 and about 12 parts by weight water, with an even more preferred dilution being from about 6 to about 8 parts by weight of water. (The E5 Finish formulation can be formed by creating a mixture which comprises about 7 parts water to about 1 part Korkay). In some embodiments, the admixture comprises the E5 Finish formulation. In other embodiments, the admixture comprises a water dilution or water-removed concentration of the E5 finish or a chemically identical preparation of the foregoing. In other embodiments, the admixture comprises or consists essentially of the E5 Finish. In further embodiments, the foregoing admixture is added to the Readymix in amounts in the range of from about 0.5 to about 8 oz per 100 lbs cement, with from about 2 to about 5 oz per 100 lbs cement preferred, and from about 2.5 to about 3.5 oz per 100 lbs cement even more preferred, with from about 2.8 to about 3.2 oz per 100 lbs cement being most preferred.

For amounts of E5 Finish greater than about 5 ounces of E5 Finish per 100 wt cementitious materials, or for amounts of amorphous silica greater than about 5 ounces per 100 wt cementitious materials, the observed benefits of the invention may begin to diminish in that increased brittleness and decreased compressive strength may, in some cases, be observed. For a given content of amorphous silica (or E5 Internal Cure) and Korkay (or E5 Finish) within the preferred (or broadest) ranges indicated herein, it can generally be expected that a change in the amount of amorphous silica away from about 4 ounces per hundredweight or in the amount of E5 Finish away from about 3 ounces per hundredweight gives some reduction in abrasion resistance, water impermeability and compressive strength.

Note that the formulations are generally employed as an admixture, and thus they are prepared in the prescribed proportions and added to a bulk concrete mixture, such as adding to a ReadyMix which contains a concrete mixture which comprises the small particle-size amorphous silica, such as the concrete mixtures described infra. Such admixture addition is most preferred.

However, the separate addition of the components of the admixture may be permissible. For example, it may be permissible to add some or all of one or more of the water, glycolic acid, dipropylene glycol methyl ether or polyethylene glycol components to the concrete mixture, particularly after the mixture is fully mixed, before adding the balance of the admixture. For example, the concrete mixture could be prepared with at least some of the water allocated to the admixture. It should be understood that in such a situation, in ascertaining the amounts of water in the concrete mixture and the admixture, the total amount of water should be considered as the sum of two subquantities: one which is within the limits of the total amount of water permitted for the concrete mixture, and the second within the total amount of water permitted for the admixture. Such separate addition of components may give some effect of the present invention. However, for optimum results, it is strongly preferred to use the admixture embodiment, as described herein, in which a mixture of components, the mixture comprising an alpha-hydroxy acid, a glycol alkyl ether, a polyethylene glycol and water, is added to a Readymix which contains a mixed concrete mixture comprising amorphous silica, as described infra.

Without desiring to be bound by theory, it is thought that the heat generated during concrete curing aids in the formation of a tough, plastic-like matrix throughout the concrete during curing as a result of the components of the admixture, interacting with the amorphous silica in the concrete (as a result of using the admixture in the preparation of the concrete). Such a result is indicated by experiments in which E5 Internal Cure is mixed directly with E5 Finish, in a container, with heat, giving a tough translucent or clear substance, such as is thought to be the substance of the matrix.

The admixture is combined into a concrete mix which comprises amorphous silica, which can be added as E5 Internal cure, if desired. In general, the concrete mix comprises amorphous silica having particles with an average particle size of less than about 55 nm, and in some embodiments, an average particle size of less than about 7.8 nm, or, in other embodiments, an average particle size between about 5 and about 55 nm, or between about 5 and about 7.9 nm; and having a surface area in the range of from about 430 to about 900 $m^2/g$; and present in the concrete in a weight ratio in the range of from about 0.1 to about 4 ounces amorphous silica per 100 lbs of cement (i.e., not including water, aggregate, sand or other additives).

Amorphous silica from other sources may be suitable as long as it is characterizable by the particle size parameters above. Nonlimiting examples of suitable amorphous silica include colloidal silica, precipitated silica, silica gel and fumed silica, with colloidal silica or silica gel being preferred. It is more preferred to use particles with average particle size of less than about 25 nm, with average particle size of less than about 7.9 nm is even more preferred. A more preferred weight proportion in the concrete is from about 0.1 to about 3 ounces of amorphous silica per 100 lbs of cement (not including water, aggregate, sand or other additives). An even more preferred weight proportion in the concrete is from about 0.1 to about 1 ounces of amorphous silica per 100 lbs of cement (again, not including water, aggregate, sand or other additives).

In yet other embodiments, amorphous silicas with surface areas in the range of from about 50 to about 900 $m^2$/gram are preferred, with about 150 to about 900 $m^2$/gram more preferred, and about 400 to about 900 $m^2$/gram even more preferred. Amorphous silica with an alkaline pH is preferred, with a pH in the range of from 8 to 11 being more preferred.

In yet another embodiment, the amorphous silica is provided by the use of E5 INTERNAL CURE, an additive available commercially from Specification Products LLC. In one embodiment, the weight proportion of E5 INTERNAL CURE to cement is in the range of from about 1 to about 20 ounces of E5 INTERNAL CURE to 100 lbs cement (not including water, sand, aggregate or other additives). More preferably the weight proportion of E5 INTERNAL CURE to cement is in the range of from about 1 to about 10 ounces of E5 INTERNAL CURE to about 100 lbs cement (not including water, sand, aggregate or other additives). An even more preferred weight proportion E5 INTERNAL CURE to cement is in the range of from about 1 to about 5 ounces of E5 INTERNAL CURE to about 100 lbs cement (not including water, sand, aggregate, or other additives). An ideal value is in the range of about 3-5, or about 4 ounces per hundred weight.

Surprisingly, the use of more than about 20 ounces of E5 INTERNAL CURE to about 100 lbs cement (not including water sand, aggregate or other additives), or the use of more than about 5 ounces of amorphous silica to about 100 lbs cement (not including water, sand, aggregate, or other additives) can cease to be of benefit in that beneficial water or compressive strength benefits may not be observed, or may be minimally observed.

The order of addition of the amorphous silica and the admixture (for non-limiting example, E5 Internal Cure and E5 Finish, respectively) is important to realizing the maximum benefit from the inventive processes, compositions, and concretes. For example, it is strongly preferred to add the amorphous silica to the cement mix prior to the addition of the cutter-containing admixture.

The amorphous silica is preferably combined with the cement mixture according to the section below entitled "Novel Compositions for Improved Concrete Performance".

A concrete mix is created from components comprising quantities of a) a dry cement mix; b) water; c) amorphous silica; and d) aggregate and/or sand.

Dry cement mixes generally have a recommended water content which gives a water/cement ratio providing a concrete mix which has a combination of desirable pouring and curing characteristics. In some cases, the recommended water content encompasses a range of water contents. As indicated infra, the initial water content of concrete mix prior to pouring can give rise to issues during curing and finishing which reduce the quality of the resulting concrete installation (slab, footing, etc.). It is common for water-reducing measures, such as the use of "water-reducers" and superplasticizers to be employed in the interests of reducing water-mediated structural flaws in the cured concrete. It should be noted that while the benefits of the present invention should be evident in circumstances in which the water content is being reduced below that recommended by the manufacturer, the present invention can be used to give the inventive concrete in situations in which the water included in the concrete mix is equal to or greater than the amount specified by the manufacturer of the dry cement mix. Water-reducers in the concrete mix are generally unnecessary.

Thus, in a broad aspect, the cement mix and the water are present in the concrete mix in the following proportions:
A quantity of water; and a quantity of dry cement mix, said cement mix characterized by:

i) a manufacturer suggested water/cement ratio value; wherein said suggested ratio falls in the range of from about 0.35 to about 0.65; and whereupon combination with the quantity of water, the water/cement ratio is greater than the value corresponding to about 10% less than the suggested value but less than the value corresponding to about 30% more than the suggested value;

or ii) a manufacturer suggested water/cement ratio range, having an upper value and a lower value, and whereupon combination with the quantity of water, the water/cement ratio is greater than the value corresponding to about 10% less than the lower value and not greater than the value corresponding to about 30% more than the upper value;

or iii) an amount such that, whereupon combination with the quantity of water, the water/cement ratio is in the range of from about 0.35 to 0.65.

The benefits of the invention are generally expected to be manifest with the use of commercially useful types of Portland cement. The cement mix is one or more of the types commonly used in construction, such as, for example, Portland cements of Types I, I, III, IV and V.

The quantity of water above is added to the cement mix. This quantity is inclusive of all water which is combined with the concrete mix comprising at least the cement mix, except water introduced with the silica in the case of water-containing formulations of silica such as colloids, dispersions, emulsions, and the like; as well as water introduced with the cutter-containing admixture. As further detailed below, the water can be combined with the concrete mix comprising at least the cement mix in multiple portions, such as, for example, the addition of a second portion of water (for example, "tailwater") after a first portion of water has been combined with the concrete mix and agitated for a time. Note that water is sometimes applied to the surface of concrete after it has partially cured, to prevent the premature drying of the surface, which could result in shrinkage, as well as later difficulties in working and finishing. This "finishing" water is not included within the quantity of water. In other embodiments, the water/cement ratio is in the range of from about 0.38 to 0.55, or, in more specific embodiments, in the range of from about 0.48 to about 0.52, or in the range of from about 0.38 to about 0.42.

In a more preferred embodiment, in reference to i), ii), and iii), above, the water and cement mix are present in the concrete mix in the proportions wherein upon combination of the quantity of dry cement mix with the quantity of water, the water/cement ratio is:

equal to or greater than the suggested value, but not greater than the value corresponding to 30% more than the suggested value; or equal to or greater than the upper value of the suggested range, but not greater than the value corresponding to about 30% more than the upper value; or at least 0.35, but not greater than 0.65.

Particle size of amorphous silica is particularly important. Larger particle sizes, such as will be found in micronized silica, generally do not reduce the formation of capillaries and voids to the degree seen when amorphous silica sized as prescribed herein is used in the prescribed amounts. The inventive concrete mix comprise a quantity of amorphous nanosilica, which is preferably present in an amount in the range of from about 0.1 to about 7.0 ounces per hundredweight of cement (cwt) in a), and having particle sizes such that the average silica particle size is in the range of from about 1 to about 55 nanometers, and/or wherein the surface area of the silica particles is in the range of from about 300 to about 900 $m^2/g$, or in other embodiments, from about 450 to about 900 $m^2/g$.

Amorphous silica from various sources is generally suitable as long as it is characterizable by the particle size and surface area parameters above. Nonlimiting examples of suitable amorphous silica include colloidal silica, precipitated silica, silica gel and fumed silica. However, colloidal amorphous silica and silica gel are preferred, and colloidal amorphous silica is most preferred.

In further embodiments, the silica particle size is in the range of from about 5 to about 55 nm. Preferred are particles with average particle size of less than about 25 nm, with average particle size of less than about 10 nm more preferred, and average particle size of less than about 7.9 nm even more preferred. A preferred weight proportion in the concrete is from about 0.1 to about 3 ounces of amorphous silica per 100 lbs of cement (not including water, aggregate, sand or other additives). A more preferred weight proportion in the concrete is from about 0.1 to about 1 ounces of amorphous silica per 100 lbs of cement (again, not including water, aggregate, sand or other additives). Even more preferred is about 0.45 to about 0.75 ounces of amorphous silica per 100 lbs of cement (again, not including water, aggregate, sand or other additives). Surprisingly, above about 3 to about 4 ounces of the amorphous nanosilica per 100 lbs cement mix, the concrete mix can become difficult to pour or work, and compressive strength can suffer greatly, even with respect to non-silica controls. Otherwise, amounts above about 1 ounce per 100 lbs cement generally give decreasing compressive strength gains with respect to the preferred range of about 0.45 to about 0.75 ounces of amorphous silica per 100 lbs cement. The preferred range given is the most economically feasible range, i.e., above that, the compressive strength gains are less per additional unit of silica, and cost of silica per unit increase of compressive strength may cause the cost of the concrete to become prohibitive.

Amorphous silicas having surface areas in the range of from about 50 to about 900 $m^2/gram$ are preferred, with about 150 to about 900 $m^2/gram$ more preferred, and about 400 to about 900 $m^2/gram$ even more preferred, and 450-700 $m^2/gram$ or 500-600 $m^2/gram$ even more preferred.

Amorphous silica with an alkaline pH (about pH 7 and above) is preferred, with a pH in the range of from 8 to 11 being more preferred.

In yet another embodiment, the amorphous silica is provided by the use of E5 INTERNAL CURE, an additive available commercially from Specification Products LLC, which contains about 15 wt % amorphous silica in about 85 wt % water. The silica particle characteristics are an average particle size of less than about 10 nm (measured by BET method), and a surface area of about 550 m2/g. In one embodiment, the weight proportion of E5 INTERNAL CURE to cement is in the range of from about 1 to about 20 ounce of E5 INTERNAL CURE to 100 lb cement (not including water, sand, aggregate or other additives). More preferably the weight proportion of E5 INTERNAL CURE to cement is in the range of from about 1 to about 10 ounces of E5 INTERNAL CURE to about 100 lb cement (not including water, sand, aggregate or other additives). A more preferred weight proportion of E5 INTERNAL CURE to cement is in the range of from about 1 to about 5 ounces of E5 INTERNAL CURE to about 100 lb cement, with about 3 to about 5 ounces of E5 INTERNAL CURE to about 100 lb cement (not including water, sand, aggregate, or other additives) even more preferred. Surprisingly, the use of more than about 20 ounces of E5 to about 100 lb cement (again, not including water sand, aggregate or other additives) can cease to be of benefit in that additional beneficial water or compressive strength benefits may not be observed or may be minimally observed. The resulting concrete mix may be difficult to pour, and any resulting concrete may be of poor quality. Note that the quality of the concrete diminishes with the distance from the preferred range of about 3 to about 5 ounces per 100 lb cement, but the compressive strength may still be improved over that in the absence of the E5 INTERNAL CURE colloidal amorphous silica. In preferred embodiments the colloidal silica added to the concrete mix is in the range of from about 40 to about 98 wt % silica, with 60 to 95 wt % preferred and 70 to 92 wt % more preferred, and 75 to 90 wt % even more preferred.

Aggregate and sand can generally be used in the inventive concrete in amounts as known in the art for construction purposes. In one embodiment, a quantity of aggregate and/or a quantity of sand is used such that they total an amount in the range of from about 400 to about 700 wt % bwoc, In general, a concrete mix is prepared with components comprising cement mix, water, and, preferably, a quantity of aggregate and sand (sometimes referred to in the art as "large aggregate" and "small aggregate," respectively). It is permissible for the concrete mix to comprise only one of the two, such as only sand or only aggregate, but it is preferred the mix comprise at least a quantity of each. Sand and aggregate can contribute to the silica content of the cement mixture, and thus they can affect (i.e., raise somewhat) the water requirement of the concrete mix. Generally, most types of aggregate which are appropriate for the use to which the concrete is to be put can be used. Included are larger aggregates such as coarse, crushed limestone gravel, larger grades of crushed clean stone, and the like, as well as smaller aggregates such as the smaller grades of crushed clean stone, fine limestone gravel, and the like. Likewise, many types of sand, such as pit (coarse) sand, river sand and the like can be used. Generally, in concrete applications, "coarse sand" is preferred to "soft sand," which is known to be more appropriate for use in mortars. However, soft sand may generally be expected to have a different water requirement than coarse sand when used in concrete preparation. As is known in the art, weight-bearing applications may require larger aggregate, such as coarse, crushed limestone. Such larger aggregate is preferred for poured concrete applications, particularly for use in poured building slabs are the larger aggregates, such as, for example, coarse crushed limestone gravel and larger grades of crushed clean stone, and pit sand.

The proportion of aggregate and sand, taken together, based on weight of cement (bwoc) is preferably in the range of from about 2000 to about 4000 lbs per yard of dry cement mix (in the range of from about 520 to about 610 lbs per yard, or more preferably from about 560 to about 570 lbs per yard, even more preferably, about 564 lbs per yard). More preferred is a combined proportion of aggregate and sand in the range of from about 2700 to about 3300 lbs per yard of dry cement mix. More preferred is a range of from about 2900 to about 3100 lbs per yard of dry cement mix. In another embodiment, the weight of aggregate and sand is between 50 and 90 wt % based upon the weight of the concrete, with a range of from about 70 to about 85 wt % preferred. The relative amounts of aggregate and sand are not critical, but are preferably in the range of from about 20 wt % to about 70 wt % sand based upon the combined weight of the sand and aggregate, with about 40 wt % to about 50 wt % sand preferred.

It has been discovered, especially in commercial scale pours, that even the small amounts of amorphous nanosilica required to effect the disclosed benefits, when added to the cement mix prior to the water, can be detrimental to the pourability of the concrete mix, as well as the quality of the resultant concrete, even rendering the concrete unsuitable. The process of the present invention generally includes the situation in which at least a portion of the quantity of water is added prior to the addition of the quantity of amorphous nanosilica, with at least a time period of agitation between the additions to distribute the water prior to the addition of the amorphous silica. In practice, some water may be added later in the preparation process, if desired. For example, it is known to add water in two (or more) portions, such as the practice of adding a portion as "tailwater" after the addition and agitation of a first portion. In one embodiment, the amorphous silica is added as a colloidal silica with a second portion of water. In a preferred embodiment, the colloidal silica is added after the addition of water which has been added in two portions, with agitation after the addition of each portion.

Thus, more generally, the quantity of water can be added in its entirety or added in portions comprising an initial portion, comprising in the range of from about 20 wt % to about 95 wt % of the quantity of water, and a tailwater portion, comprising the remainder; wherein the initial portion of water is combined with the quantity of cement mix and the aggregate/sand components to form a first mix; and wherein the amorphous silica is added to a mix comprising the quantity of cement mix, the aggregate/sand components and the initial portion of water to form a second mix. Even more preferred is an initial portion comprising in the range 35 to about 60 wt % of the quantity of water.

(The below three situations (i.e., "situation 1", "situation 2" and "situation 3") correspond, respectively to i) the addition of the silica after the addition of the tailwater; ii) the addition of the silica before the addition of the tailwater; and iii) the co-addition of the silica with the tailwater.)

In embodiments with split water addition, wherein the tailwater is 1) added to the first mix; or 2) added to the second mix; or 3) co-added with the amorphous silica to the first mix, wherein the amorphous silica and the tailwater are, optionally, intercombined; and wherein 1) the first mix is agitated for a time $t_{11}$ prior to the addition of the tailwater, for a time $t_{12}$ after the addition of the tailwater but before the addition of the amorphous silica, and for a time $t_{13}$ after the addition of the amorphous silica but before the addition of the admixture; or 2) the second mix is agitated for a time $t_{21}$ prior to the addition of the amorphous silica, for a time $t_{22}$ after the addition of the amorphous silica but before the addition of the tailwater, and for a time $t_{23}$ after the addition of the tailwater, but before the addition of the admixture; or 3) the second mix is agitated for a time $t_{31}$ prior to co-addition of the amorphous silica and the tailwater, and whereupon the concrete mix is then agitated for a time $t_{32}$ after the addition of the silica, but before the addition of the admixture.

In situation 1), in which the second portion of water (tailwater) is added to a concrete mix comprising a first portion of water, the quantity of cement mix and the sand/aggregate components, $t_{11}$ is preferably in the range of from about 2 to about 8 minutes, with about 3 to about 6 minutes more preferred, and at a mixing speed (such as for example, in a Ready-mix) preferably in the range of from about 2 to about 5 rpm. Time $t_{12}$ is preferably in the range of from about 0.5 to 0.17 about 4 minutes, with a more preferred range of from about 1 to 2 minutes, at a mixing speed in the range of from about 2 to about 5 rpm. Time $t_{13}$ is preferably in the range of from about 2 to about 10 minutes, with a range of from about 5 to about 10 minutes more preferred, with a relatively high mixing speed at a rate in the range of from about 12 to about 15 rpm before the addition of the admixture. After the admixture is added and mixed in as described below, the rate can be lowered to a rate in the range of from about 2 to about 5 rpm for a time, such as, for example, a transit time to a pour site. Transit time standards are set by the American Concrete Institute. For example, the concrete must be poured within 60 minutes of the end of high-rate mixing if the temperature is 90 F or greater, and within 90 minutes if the temperature is less than 90 F.

In situation 2), in which the second portion of water (tailwater) is added to a concrete mix comprising a first portion of water, the quantity of cement mix and the sand/aggregate components, and the amorphous silica, $t_{21}$ is preferably in the range of from about 2 to about 8 minutes, with about 3 to about 6 minutes more preferred, and at a mixing speed (such as for example, in a Ready-mix) preferably in the range of from about 2 to about 5 rpm. Time $t_{22}$ is preferably in the range of from about 0.5 to about 2 minutes, with a more preferred range of from about 0.5 to 1 minutes, at a mixing speed in the range of from about 2 to about 5 rpm. Time $t_{23}$, the time immediately prior to the addition of the admixture, is preferably in the range of from about 2 to about 10 minutes, with a range of from about 5 to about 10 minutes more preferred, with a relatively high mixing speed at a rate in the range of from about 12 to about 15 rpm. After the admixture is added and mixed in as described below, the rate can be lowered to a rate in the range of from about 2 to about 5 rpm for a time, such as, for example, a transit time to a pour site. As noted above, transit time standards are set by the American Concrete Institute.

In situation 3), in which the tail water is co-added with the amorphous silica to the first mix, wherein the amorphous silica and the tailwater are, optionally, intercombined, ti is preferably in the range of from about 2 to about 8 minutes, with about 3 to about 6 minutes more preferred, and at a mixing speed (such as for example, in a Ready-mix) preferably in the range of from about 2 to about 5 rpm. Time $t_{32}$, the time immediately prior to the addition of the admixture, is preferably in the range of from about 2 to about 10 minutes, with a range of from about 5 to about 10 minutes more preferred, with a relatively high mixing speed at a rate in the range of from about 12 to about 15 rpm. After the admixture is added and mixed in as described below, the rate can be lowered to a rate in the range of from about 2 to about 5 rpm for a time, such as, for example, a transit time to a pour site. As noted above, transit time standards are set by the American Concrete Institute.

In another embodiment, the entire quantity of water is added to the quantity of cement mix and the aggregate/sand components to form a mix, whereupon said mix is agitated for a time $t_a$ prior to the addition of the amorphous silica, whereupon the concrete mix is then agitated for a time $t_b$ prior to the addition of the admixture. The addition of the entire quantity of water at once is useful in the case of wet batch processes. Time $t_a$ is preferably in the range of from about 2 to about 8 minutes, with about 3 to about 6 minutes more preferred, and at a mixing speed (such as for example, in a Ready-mix) preferably in the range of from about 2 to about 5 rpm. Time $t_b$ is preferably in the range of from about 2 to about 10 minutes, with a range of from about 5 to about 10 minutes more preferred, with a relatively high mixing speed at a rate in the range of from about 12 to about 15 rpm. After the admixture is added and mixed in as described below, the rate can be lowered to a rate in the range of from about 2 to about 5 rpm for a time, such as, for example, a transit time to a pour site. As noted above, transit time standards are set by the American Concrete Institute. While benefits of the invention would generally be observed in the case of a single addition of water, in practice, the two-portion division of water is generally adhered to. After the agitation of a concrete mix comprising a first portion, the use of a second portion has the advantage of washing down into the Ready-mix remnants of insufficiently mixed cement mix from near the mouth of the barrel.

The admixture is preferably added at a point which the mixture comprises the silica, and the silica-comprising mixture has been thoroughly mixed before the addition of the admixture. Thus, in addition to the above recommendations with respect to the silica addition, there are, similarly, recommendations prior to and after the addition of the cutter-containing admixture, but before pouring. These conditions are consistent with the above conditions. In preferred embodiments, the silica-comprising mixture is mixed for a total time of at least 3 minutes at one or more speeds greater than about 6 RPM. In more preferred embodiments, the silica-comprising mixture is mixed for a time in the range of from about 5 to about 15 minutes, and more preferably in the range of from about 5 to about 10 minutes, at one or more speeds in the range of from about 7 RPM to about 15 RPM, and more preferably in the range of from about 12 to about 15 RPM. After the forgoing mixing step, the cutter-containing admixture is added. In preferred embodiments, the mixture which contains the cutter-containing mixture is mixed for a total time of at least 3 minutes at one or more speeds greater than about 6 RPM. In more preferred embodiments, the cutter-containing mixture is mixed for a time in the range of from about 5 to about 15 minutes, and more preferably in the range of from about 5 to about 10 minutes, at one or more speeds in the range of from about 7 RPM to about 15 RPM, and more preferably in the range of from about 12 to about 15 RPM.

The concrete mixture can be prepared in a wet ("central mix") or dry ("transit mix") batch situation. In wet batch mode, the dry components are mixed with the quantity of water followed by the amorphous silica to give a concrete mix, in one of the ways indicated above. The mix is agitated as above or introduced into a Ready-mix and agitated therein as indicated above. Essentially, the wet and dry batch situations are similar except that part of the procedure for a wet batch is performed outside of the Ready-mix (for example, at the plant). Dry batching ("transit mix") is somewhat preferred. For example, 40 plus or minus 20%, or, in further embodiments, plus or minus 10% of the total quantity of water to be utilized in the preparation of the concrete mix, sand and coarse aggregate used in the batch is loaded into a Ready-mix. The cement mix, coarse aggregate and sand are mixed together and loaded into the Ready-mix. The remaining water is then loaded into the Ready-mix. Once the dry components and the water are completely mixed, the amorphous silica is added, and the mixture is mixed for 5 to 10 minutes. The mixing preferably takes place at relatively high drum rotation speeds, such as, for example, a speed in the range of from about 12 to about 15 rpm. Once the higher-speed mixing has occurred, the batch can then be poured. However, it is permissible to have a period of time between the higher-speed mixing and pouring, such as transport time to the pouring site. In general, as long as the concrete is mixed at lower speeds, such as, for example, about 3 to about 5 rpm, a time between the high-speed mixing and the pouring of in the range of from about 1 to about 60 minutes is permissible.

In one embodiment, it is particularly convenient to add the silica to a Ready-mix, which contains the water, cement and other dry components, once the Ready-mix has arrived at the pour site. It has further been found that after the amorphous silica has been added, the concrete/silica mixture should be mixed, prior to pouring, for a time, most preferably at least from about 5 to about 10 minutes. However, other periods of time may be permissible with respect to at least partially obtaining the benefits of the invention.

The benefits of the invention can be expected in commercially used variants of the foregoing process, as long as the amorphous silica is added at the end, after the mixing together of the dry components and the first and second portion of water (or with the second portion of water), and the silica-added mixture is mixed for a time as specified herein prior to pouring.

In a preferred embodiment, it is particularly convenient to add the silica to the Ready-mix, which contains the water, cement and other dry components, once the Ready-mix has arrived at the pour site. It has further been found that after the amorphous silica has been added, the concrete/silica mixture should be mixed, such as, for example, with a Ready-mix mixer, for a time, most preferably at least from about 5 to about 10 minutes, preferably at a high speed, such as, for example 12-15 rpm. However, other periods of time and other speeds may be permissible with respect to at least partially obtaining the benefits of the invention.

The concrete mixture can be prepared in a wet or dry batch situation, as desired. For example, 40 plus or minus 15%, or, in additional embodiments, plus or minus 10%, of the water needed to fully wet the cement, sand and coarse aggregate to be used in the batch is loaded into a Ready-mix. The cement mix, coarse aggregate and sand are mixed together and loaded into the Ready-mix. The remaining water is then loaded into the Ready-mix.

Once the dry components and the water are mixed, the amorphous silica is added and the mixture is mixed for a time in the range of from about 3 to about 15 minutes, and more preferably in the range of from about 5 to about 10 minutes; preferably at relatively high drum rotation speeds, such as, for example, a speed in the range of from about 8 to about 20 rpm, and more preferably about 12 to about 15 rpm. It is permissible to have a period of time between the higher-speed mixing and silica addition, such as transport time to the pouring site. In general, as long as the concrete is mixed at lower speeds, such as, for example, about 3 to about 5 rpm, a time between the high-speed mixing and silica addition of in the range of from about 1 to about 60 minutes is permissible. In an embodiment, the cement mixture containing the silica is preferably fully mixed before admixture addition. Once the higher-speed mixing has occurred, the admixture can then be added, such as to the Ready-mix. Once the silica has been added to the mix and fully combined, it is preferable to add the admixture to the batch within 30 minutes, more preferably, within 20 minutes, and even more preferably within 10 minutes. Once the admixture has been added to the concrete mixture comprising a mixed-in amorphous silica component, the admixture-containing mixture can then be mixed at speeds in the range of from about 1 to about 18 rpm, for a time in the range of from about 2 to about 20 minutes.

A indicated above, it is common for concrete to be mixed with split water addition, i.e., with a portion of the water added prior to the addition of the dry components and a portion added after the first portion and the dry components are mixed together for a time. The benefits of the invention can be expected in all commercially used variants of the forgoing process, as long as
1) the amorphous silica is added after the mixing together of the dry components and the water (regardless of whether the water is added in one portion or 2 or more portions), within about 60 minutes of the batching (i.e., complete mixing) of the water and other concrete components;
2) The silica-containing mixture is mixed at relatively high drum rotation speeds (such as, for example, one or more speeds in the range of from about 8 to about 20 rpm for a time in the range of from about 3 to about 15 minutes;
3) The admixture is added to the silica-containing mixture and the resulting mixture is mixed at one or more speeds in the range of above about 1 rpm, for a time in the range of from about 2 to about 20 minutes, which preferably includes a period of time of at least 1 minute, but as long as 18 minutes, or even longer, at a speed of above about 10 rpm, and more preferably in the range of from about 12 rpm to about 15 rpm; and
4) The concrete mixture is poured within about 60 minutes of the mixing of 3).

The abrasion resistance of the concrete formed from the inventive compositions and methods is generally increased with respect to concrete which is formed from standard methods and compositions (i.e., prepared without added amorphous silica and the admixture). Subjecting the inventive concrete to abrasion-resistance test ASTM C944 generally gives a smaller weight loss resultant than standard concrete prepared substantially the same way, but in the absence of the amorphous silica and the admixture. For example, as shown by Examples 1 and 3, standard concrete has a higher abrasion loss than the concrete of the present invention. The standard concrete of Example 3 exhibits an abrasion loss of 1.1 grams, whereas concrete formed from the compositions and by the methods of the present invention gives a loss of 0.6 grams. In general, concrete of the present invention can give abrasion losses which are reduced with respect to standard concrete by as much as fifty percent or even more. By standard concrete, it is meant concrete prepared by comparable methods, components, and component proportions, but without the addition of the disclosed amorphous silica and the disclosed admixture.

The following is a detailed description of the finishing step procedures throughout which the advantages of the present invention are made manifest.

The finishing of concrete for inside use generally involves three successive steps after a poured slab begins to cure: floating, combination and a final finishing step. Each is undertaken at specific curing stages, and the ascertainment of when to commence each step is within the skilled judgement of the practitioner. Because many or most slabs are often the first element of new construction, the outside elements, such as temperature, relative humidity and wind speed play a role in the determination. As discussed in the section entitled "Novel Compositions for Improved Concrete Performance," the use of a specific type of amorphous silica, in the context of a specific process for preparing the concrete, minimizes many of the outside element effects on curing. Thus, the standard three-step finishing process is much easier, with each step often requiring less energy, and less risk of concrete damage during finishing. For example, all three are generally required to get the standard finish on the concrete of construction slabs, which are the basis for most home and commercial construction. In the context of the present invention, floating is generally easier than with standard concrete due to the excellent water retention properties of the concrete described infra. Floating can be done by methods known in the art, such as, for example, hand trowel, walk behind, power ride-on trowel, or with use of 36, 48 or 60-inch pans or float shoes. Generally, because of the reduced friction between the blades and the surface, the effort needed to float is reduced with respect to that needed to float traditional concrete, and thus the machine speeds can be significantly lower than the speeds required for floating concrete prepared by existing methods, minimizing the potential for damage to the concrete surface.

The combination step is then generally performed as known in the art, such as by, for example, a ride on power trowel or walk behind trowel with combination blades. It is during this step that the plastic-like nature of the surface generally becomes more apparent and pronounced. The surface is generally distinctly different from the surface developed during combination by concretes which do not contain both the following; 1) the inventive amorphous silica amounts, particle sizes and surface areas as disclosed herein, and 2) the inventive admixture formulations as disclosed herein. The effect has been described by the inventors as "plastic-like." The surface develops a smoother appearance, which generally increases, to a degree, with combination time, the surface having a reduced incidence of large pores, as well as improved flatness, when compared to widely-used concrete formulations at like stages of finishing that lack the inventive formula and process details as disclosed herein. By "plastic-like," it is meant that the surface at least has the appearance of, a coating, said coating generally not of high clarity during combination, being occluded to a degree which can be decreased, to a degree, with the progress of combination and/or increasing combination blade speed. At later times during combination, it may or may not take on the glassy texture and even greater clarity as with later finishing steps. The use of higher combination speeds (above about 190 rpm) than used with traditional concrete may give an improved finish with respect to clarity and glossiness, but not necessarily. (It should be noted that there may be situations in which the combination is not performed or is otherwise deemed unnecessary.) Again, the higher amount of water retained by the concrete at its surface generally results in less friction between the surface and the combination blades, and thus less energy is required by the machine to maintain a given speed. The risk of machine damage to the surface is generally greatly reduced.

The finishing step can then be performed. The methods known in the art can be used, such as, for example, a ride on power trowel or walk behind trowel with finishing blades. Those who have worked with the inventive concretes indicate that with the finishing step, the surface increasingly takes on glassy characteristics, such as a clarity which is increased over concretes known in the art and prepared in the same fashion, although not as clear as can generally be obtained with a burnishing step. Without desiring to be bound by theory, it is thought that the increased clarity is a consequence of the retention of moisture in the concrete surface, attributable to the inventive inclusion of silica as disclosed herein. The clarity, gloss and flatness achievable after the finishing step is generally enough to qualify as a "Grade 1" finish. With traditional concretes (i.e., wherein the disclosed topical or admixture use of the prescribed formulations and the disclosed amorphous silica are not used), the finishing step does not necessarily give this glassiness, i.e., heightened clarity and/or glossiness, with traditional top finishing speeds of about 190 rpm.

Most available finishing machines are limited to a top speed of about 190 rpm, but some older machines can attain top speeds of about 220 rpm. One characteristic often seen with the use of either the admixture or topical use of the inventive formulations is that the use of higher finishing blade speeds (such as, for example, 200-220 rpm) than traditionally used (such as, for example, 180-200 rpm) can improve the finish over that achievable at traditional speeds, such that the surface takes on yet greater glossiness and clarity than that achievable at lower speeds. The surface thereby achieved is often still a "Grade 1" finish, but with an increased clarity and gloss with respect to surfaces of the invention which have not been finished at such increased speeds. As far as is known by the inventors, such clarity enhancement at higher speeds is specific to concrete surfaces of the present invention.

The time of finishing is until the surface has the desired appearance. For example, two passes may be necessary in order to observe a finish having superior clarity, glossiness and flatness. It should be noted that the finish can take on a more matte appearance during the combination step, which, if desired can be retained by not performing the final finishing step. In order to obtain a finish having a more glass-like appearance and texture, it is generally necessary to proceed to the final finishing stage.

Finishing can be done to various grades, based upon the desired glossiness and clarity of the concrete surface. Finishing with a finishing machine, as described above and as performed in the industry, at top speeds of 190 rpm, generally results in a "Grade 1" finish, as is well-known in the art.

Further elevations in the quality of the surface, i.e., heightened gloss and clarity, can generally be achieved with the use of a burnishing machine, also well-known in the art, in order to develop a "Grade 2" or "Grade 3" finish. One of skill in the art can generally ascertain the grade of a finish by visual inspection of the finished surface. (Approximate RA (roughness average) reading corresponding to the various grades: Grade 1 generally corresponds to RA of 50-20; Grade 2 generally corresponds to an RA of 19-11; Grade 3 generally corresponds to a RA of 5-0.) It should be noted that the quality of finish upon burnishing depends on the quality of the finish given by the finishing step, which generally gives a Grade 1 surface. The higher grade finishes achieved by burnishing generally have a polished look to them. Note that unlike with traditional concretes, the gloss of a burnished floor of the present invention is achieved without the use of a protectant or sealant.

Because floor burnishing machines operate at much higher speeds (rpm) than finishing machines, it has heretofore been necessary to wait for some time after completion of finishing, such as at least about three or four days, and as long as 28 days or even longer, before using a burnishing machine on a finished surface. It is known in the art that earlier use generally risks significant damage, such as scratching (can go quite deep: 2-4 mm) and exposed aggregate, to the finished surface. Remarkably, concrete which has been prepared with amorphous silica, as disclosed and described herein, as well as the admixture or topical finishing use of the formulations disclosed and described herein, can be burnished immediately after finishing, if desired, without damage to the concrete surface.

More specifically, concrete which has been prepared with the amorphous silica as described herein or in U.S. Provisional Application 62/761,064 (incorporated by reference and included herein), and additionally having been prepared with the admixture use of the Korkay- or E5 Finish-containing formulations described herein, can be burnished immediately after the finishing step without damaging the surface of the concrete.

Burnishing machines generally come in three sizes (17, 20- and 27-inch diameter) with the larger diameter machines reaching speeds as high as 2500 rpm. Generally, the higher speeds give better clarity and gloss. One remarkable feature of the present invention is that concretes prepared by traditional methods generally require the application of a guard or sealer prior to burnishing in order to attain the Grade 2 or Grade 3 quality of glossiness, with a wait as long as 28 days often required before burnishing can be commenced. Concretes of the present invention can be burnished immediately following finishing without the application of guards or sealers, without damaging the concrete surface. Without desiring to be bound by theory, it is thought that the finishing and burnishing steps cause the amorphous silica to react with the topical or admixture formulation to create a glassy substance or phase, with a more complete reaction associated with higher finishing machine and burnishing machine rpms. It has also been observed that, as with the finishing step, less friction is present between the machine and the floor, giving lower RA (Roughness Average) numbers and increased burnishing pad lifetimes.

The number of burnishing passes utilized is generally simply what is required to achieve the clarity and glossiness. The number of passes required to transform a Grade 1 finish to a Grade 2 finish could be as low as 3-4 or as high as 4-20. For every 1000 sq ft of surface, approximately 20 minutes of high-speed burnishing may be required to transform a Grade 1 to a Grade 2. It has been noticed that if the floor does not develop a gloss during finishing, it is unlikely to burnish. Experience suggests that waiting some time after finishing, such as, for example, from 1-24 hours, or more, to commence burnishing, may, in some circumstances, give better clarity upon burnishing.

Other advantages which are a consequence of the use of silica without the admixture (application Ser. No. 16/501,232 filed on Mar. 8, 2019, incorporated by reference for all that it teaches, without exclusion) in the present inventive method are generally not diminished with the use of the admixture. In preferred embodiments, the concrete mix is formed and agitated in the context of an industrial scale pour, such as the preparation of footings or slabs. In an additional embodiment, the concrete mix is created with and within equipment which holds the mix as it is being created, and which also has the capacity to agitate the mix, such as, for example, a Ready-mix.

An advantage of the present inventive process is that water in concrete formation, such as for example, a slab, formulated according to the present invention, appears to be immobilized in the formation rather than lost to evaporation. The likely fate of much of this water is to participate in hydration at extended periods of time rather than form capillaries and voids. Thus, it is expected that, regardless of thickness, concrete slabs, walls and other formations will display a reduction or lack of voids and capillaries, and a correlative gain in compressive strength. Concrete formation having improved structure and compressive strength with thicknesses up to about 20 feet can be formed with the concrete of the present invention.

An advantage of the present inventive process is that poured concrete are less damaged by drying caused by environmental conditions, such as temperature, relative humidity and air motion such as wind. For example, concrete of good quality can be produced at wind speeds as high as 50 mph, temperatures as high as 120° F. and as low as 10° F., and relative humidities as low as 5% and as high as 85% or even higher.

The compressive strength of the concrete formed by the method of the present invention is generally increased with respect to concrete formed by methods which are similar or, preferably, the same save for the addition of silica after the mixing of the water, cement mix and filler materials (aggregate, sand and the like). "Similar" or "the same" applies to environmental conditions such as wind speed, relative humidity and temperature profile, as well as other environmental factors, such as shading or heat radiating surroundings with respect to the assessment of increase in compressive strength. Factors within the pourer's control, such as mixing times and parameters, pouring parameters (i.e., slab dimensions) are more easily accounted for. An increase in compressive strength is preferably assessed from pours which are identical except for the addition of the amorphous silica. In a preferred embodiment, the assessment is made from pours which are prepared from identical amounts of identical ingredients, simultaneously but in separate Ready-mixes, poured side-by-side, at the same time, but using separate Ready-mixes. Such pours are "substantially identical."

The increase in compressive strength can be in the range of from about 5 to about 40% or even more, based upon the compressive strength of the non-silica-containing pour of a pair of substantially identical pours. In more commonly observed embodiments, the compressive strength increase as assessed through substantially identical pours is in the range of from about 10 to about 30%.

The concrete of the present invention can generally be used in applications which require poured concrete, such as, for example, slabs, footings, and the like. An advantage of the present invention is that the concrete prepared therefrom is generally of increased resistance to water penetration, and can thus be used in poured applications which are particularly prone to moisture exposure and the associated damage, such as footings.

As indicated infra, the present invention includes the discovery that nanosilica, when added to a concrete mix, preferably as a colloidal silica, after the addition of at least a portion of water, gives a cement having an improved compressive strength among other improved properties, such as abrasion resistance and water permeability.

The additive concrete components such as sand and aggregates of sizes which are used in the art can generally be used in the concrete of the present invention without destroying the benefits provided by the present invention.

Thus, it is possible to utilize a concrete, comprising of ample water for hydration, pouring and working, in the preparation of concrete which generally lacks the deficiencies otherwise associated with concrete from concrete having high amounts of water of transport. The inventive compositions result in concrete which retains water such that exposed surfaces are less likely to dry prematurely than concrete which have not had amorphous silica added. The relative water retention effect is observed even in ambient conditions under which the surface would ordinarily be predisposed to desiccate. Concrete can thus be poured under a broader range of environmental conditions than standard concrete. Surfaces can thus be finished with reduced amounts of surface water, or even, in some cases, without adding surface water.

Shrinkage is generally reduced with respect to concrete containing comparable amounts of water. More remarkably, the compressive strength is increased. This result is generally obtained even though the concrete contains amounts of water of transport that would risk capillary and void formation in absence of amorphous silica.

Without desiring to be bound by theory, it is surmised that the amorphous silica may immobilize the water during curing such that the water is prevented from migrating, retarding evaporation as well as capillary and void formation. Surprisingly, the immobilization does not prevent the water from participating in long term, extended hydration, which gives the unexpected increase in compressive strength.

An overarching benefit of the present invention is the ability not to use excess water in the curing reaction (hydration) due to generally losing the water to evaporation. Such a benefit can be obtained even in the case of concrete which are poured having water levels which are less than theoretically required for full hydration of the concrete, as well as at water levels which are in excess of that theoretically required for hydration.

A problem with existing concrete preparation and pour processes is the risk taken when a pour is done in less than optimum conditions. As indicated infra, relative humidity, wind speed and temperature, among other environmental factors, routinely compromise standard pours because of their effect on the water levels at various locations on and within the concrete. This can occur even when the amount of water included complies with the recommended amount of water specified by the cement mix manufacturer, whether it is a recommended range of values or a single specified optimum value. The present invention enables the operation at the cement manufacturer's suggested water contents with a reduced risk of water-related issues. These suggested values generally correspond to the amount of water which would be required to enable the hydration reaction to proceed to an acceptable degree, or in some cases, to completion. In the practice of this invention, use of water in the amounts specified by the cement manufacturer is preferred. However, the present invention also reduces the risk of water issues with respect to other processes even when the water content deviates from that specified by the manufacturer. Thus, in some embodiments, the water content is within the range of from about −30% of the lowest value specified by the manufacturer specifications and +30% of the greatest value specified by the manufacturer specifications, based upon the weight of the water added to the cement before the addition of the colloidal amorphous or other silica described herein.

Yet another benefit of the present invention follows from the ability of formulations thereof to retain water for the benefit of extended hydration without the formation of capillaries and void reservoirs. It is known in the art that the addition of aggregate, sand and other commonly included bulking and strengthening materials to cement to form concrete generally require additional water to accommodate them in the concrete and can actually promote the formation of capillaries and, especially, void reservoirs. Such reservoirs are associated with and located in relation to the surfaces of the included materials. In general, the most preferred aggregates and materials are of a quality such that they associate closely with the concrete over their surface areas such that during hydration, reservoir formation is minimized, as is the associated loss of compressive strength. However, such high-quality included materials are generally uneconomical. Surprisingly, even in the presence of aggregates, the inclusion of amorphous silica particles can reduce or prevent the formation of void reservoirs and capillaries. Without desiring to be bound by theory, the reduction of such imperfections, particularly void reservoirs, and the associated increase in compressive strength, tends to indicate that the high surface area amorphous silica particles are participating in a direct association with the included material, regardless of material suboptimal quality. This association may exclude water and strengthen the attachment of the concrete to the included material.

Yet another benefit of the present invention is that concrete formulations prepared thereof can be pourable and/or workable without the use of so-called "superplasticizers". Non-limiting examples of such superplasticizers include ligninsulfonate, sulfonated naphthalene formaldehyde polycondensates, sulfonated melamine formaldehyde polycondensates, polycarboxylate ethers and other superplasticizer components whether they are emulsions, dispersions, powders or other chemical forms. In one embodiment, the concrete formulations of the present invention are pourable without the inclusion of superplasticizers and are superplasticizer-free or essentially superplasticizer-free. By "essentially superplasticizer-free", it is meant that the superplasticizer content is in trace amounts of less than about 0:1% based upon the weight of the cement.

Below is a non-limiting list of admixtures which can be used with the present invention. Alternatively, the concrete mixture of the present invention can be free of any or all of the below additives, or of other additives. The list below is ordered as per ASTM C 494 categories. Included are admixtures that are certified and not certified by ASTM C-494. Admixtures can be added as a powder or liquid.

Normal water reducers and retarders (Type A, B, D)
Nominal dosage range: 0.5-6 OZ/C
Super-Plasticizers: Normal setting and retarding (Type F, G)
Nominal dosage range: 2-40 OZ/C
Accelerating Admixtures: water-reducing or non-water-reducing (Type C, E)
Nominal dosage range: 2-45 OZ/C
Type S admixtures as defined in ASTM C 494:
  Mid-Range water-reducers and retarders
    Nominal dosage range: 2-45 OZ/C
  Corrosion inhibitors
Nominal dosage range: 0.25-5 GAL/YD
MVRA (Moisture vapor-reducing admixtures)
Nominal dosage range: 5-24 OZ/C
SRA (Shrinkage-reducing admixtures)
Nominal dosage range: 0.25-5 GAL/YD
Hydration stabilizers
Nominal dosage range: 0.5-24 OZ/C
Viscosity modifiers
Nominal dosage range: 0.25-8 OZ/C
Air-entraining admixtures;
Nominal dosage range: OZ as needed to entrain air: 0.1-36 OZ/C
Color agents; Liquid and solid
Nominal dosage range: 0.1-20 LB/YD Example 1

Preparation of an Interior Slab with Admixture Abrasion Resistance Measured with ASTM-C944

Pour Size: 400 Sq ft
Weather Conditions: 52-78 degrees; humidity about 60%; Sunny.

The pour was started at approximately 7:00 am, and the finishing was completed at 1:00 pm.

Concrete was placed utilizing normal practice (ACI 302). The mix design was normalized, (i.e., a standard 6 bag mix was used, a described in Step 1. The amorphous silica used was introduced as E5 Internal Cure. The admixture used was introduced as E5 Finish. The slab was prepared as indicated in steps 1-8 below.

1—A traditional class A concrete design of 6 bags (564 lbs) cement to 31 gallons of water (SSD-Saturated Surface Dry) per cubic yard (9 cubic yards total) was used to place a 4-inch thick interior concrete slab with a non-air-entrained concrete. Roughly 12 gallons of water per cubic yard was added to the Ready-mix, followed by the dry cement mix (564 lbs per yard) as well as the aggregate and sand (1250 lbs of sand, and 1750 lbs of stone per yard). The water and dry components were mixed for 1-2 minutes, and roughly 19 gallons of additional water per yard was then added to the Ready-mix. The mixture was mixed (in a concrete drum that has a high speed of 12-15 RPM for mixing of the concrete) for an additional time of 5-10 Minutes. When the driver was ready to transport the concrete to the job location, he then slowed the concrete barrel to 3-5 RPM.

2—203 total ounces of E5 Internal Cure (4 ounce/100 lbs cement were then added after the 9 yards loaded and batched. Again, there were 564 lbs cement and 31 gallons of water per cubic yard.

3—The team allowed the ready-mix driver to mix the batch for 5 minutes at a speed from 12-15 rpm.

4—The E5 Finish was then added to the Readymix truck (3 ounces per hundredweight of cement) and mixed for approximately 12 to 15 minutes. The mixing started with the truck at idle drum speed (3-5 RPM) for 2 minutes. The drum speed was then raised to 12-15 RPM for the remainder of time.

5—The slab was placed (poured) and after a 3 hour wait time, the finishing process was started.

6—A concrete walk behind trowel machine was used to perform the panning (floating) process. The pan speed of the floating process was 80-130 revolutions per minute. The process is performed for an hour and a half, at which time, the surface texture of the slab indicated that it was ready for the next power ride on trowel.

7—The walk behind trowel power trowel was fitted with combination blades and the combination process was started. After about 2 passes at the beginning of the slab, the surface had developed a plastic-like appearance. The blade speed was around 100-165 revolutions per minute. It was noted that the surface was even easier to finish than the situation in which the E5 Finish is applied topically after the pour, itself another discovery by the same inventors as with the present application. The surface exhibited greatly reduced friction with respect to the combination blades. The finisher, extremely experienced in concrete pouring and finishing, noted the low friction, commenting that "it felt like I was finishing on a ball bearing surface, with practically no resistance on the machine." As known in the art, and ascertainable by one of skill in the art, a dull haze, which would be identifiable to one of skill in the art, indicated that the surface was ready for the finishing step.

8—The walk behind trowel machine was fitted with finish blades, and the surface was subjected to finishing at a speed of about 165 rpm. The finisher noted that "the surface started to look a bit like glass" and "the more I finished the clearer the finish became." The finished surface appeared to have a coating that was somewhat glass-like in clarity, although not as clear as glass, and the slab seemed denser, more consolidated throughout the matrix than typical concretes. The Abrasion Resistance was measured according to ASTM-C944, and a loss of 0.6 grams was observed. It was expected from experience that a burnishing step could be conducted without waiting, and that the clarity of the surface coat could be improved greatly with burnishing.

Example 2

Preparation of a Footing with Admixture

Footings are a common use of poured concrete in the construction industry. The poured concrete is generally subject to constant moisture exposure due to soil contact while curing. Such constant contact can also provide a source of moisture in the case of the cured concrete. A footing was poured to observe the characteristics of concrete poured under such conditions. The intent was to observe the density of the resulting concrete (i.e., lack of capillaries and voids) in the footing and to determine if concrete strength was affected.

Pour Size: 50 ft long by 2 ft wide 30 inches thick
Conditions: 60 degrees
Pouring started at 11 am and was completed at 1 pm.
Five bags (475 lbs) cement to 31 gallons of water (SSD-Saturated Surface Dry) per cubic yard (7.5 cubic yards total) was used. Roughly 12 gallons of water per cubic yard was added to the Ready-mix, followed by the dry cement mix (564 lbs per yard) as well as the coarse aggregate (stone) and fine aggregate (sand) with 1250 lbs of sand, and 1750 lbs of stone used per yard of concrete. The water and dry components were mixed for 1-2 minutes, and roughly 19 gallons of additional water per yard was then added to the Ready-mix. All of the foregoing took place at a drum speed of 3-5 RPM. E5 Internal Cure was then added to the Readymix truck at 3 oz per hundred weight of cement. The mixture was then mixed at a high speed of 12-15 RPM for an additional time of 5-10 Minutes. The driver then slowed the concrete barrel to 3-5 RPM and drove 5-10 minutes to the test pour site. The E5 Finish was then added to the ready-mix truck at a rate of 3 oz per hundred weight of cement. The drum speed is increased to about 12-15 RPM for about 5-10 minutes, and the mixture is poured.

At about 35-45 minutes post-pour, a plastic-like surface was observed. Bleed channels were not apparent. After 24 hours, the footing showed no evidence of shrinkage, as there were no stress cracks observed. It is thought that the lack of shrinking was attributable to the closing or plugging of any channels. The surface was thus observed to be extremely dense, and this was verified by the cylinder-compression breaks. Such a result tended to indicate that the concrete could be used both inside and outside.

ASTM C39\C1231 cylinder compression break results indicated that the compression strength met or exceeded 30,000 psi at 28 days, with 25% or more of that obtained by 7 days.

Example 3

Preparation of Slab without Admixture Abrasion Resistance Measured with ASTM-C944

Location: Shelbyville, Ind. at the Shelby Materials ready-mix plant.

Environmental Conditions: The start time of the pour was 07:30 AM with a starting temperature of approximately 60° F. The ambient temperature peaked in the high 80s during the day. The relative humidity ranged from 18% to 67%. The wind speed range was from 3 to 18 mph.

Steps and Results:

1—A traditional class A concrete design of 6 bags (564 lbs) cement to 31 gallons of water (SSD-Saturated Surface Dry) per cubic yard (9 yards total) was used to place a 4-inch thick interior concrete slab with a non-air-entrained concrete. Roughly 12 gallons of water per cubic yard was added to the Ready-mix, followed by the dry cement mix (564 lbs per yard) as well as the fine aggregate (sand) and coarse aggregate (1250 lbs of sand, and 1750 lbs of Stone (coarse aggregate per yard). The water and dry components were mixed for 1-2 minutes, and roughly 19 gallons of additional water per yard was then added to the Ready-mix. The mixture was mixed (in a concrete drum at 12-15 RPM for an additional time of 5-10 Minutes. When the driver was ready to transport the concrete to the job location, he then slowed the concrete barrel to 3-5 RPM's. The time of transport to the pour site was about 5-10 min.

2—380.7 total ounces of E5 INTERNAL CURE (7.5 ounce/100 lbs cement) were then added after the 9 yards loaded and batched. Again, there were 564 lbs cement and 31 gallons of water per cubic yard.

3—The team allowed the ready-mix driver to mix the batch for 5 minutes at 12-15 rpm.

4—The concrete was then poured into the slab forms.

5—After the pour, the slab was leveled. A bull float was then used to close the surface. Once the surface was hard enough to begin the mechanical finishing process appropriate methods were used to complete the finishing.

6—During the bull floating process to close the surface, it was noted that the concrete was much easier to close than that prepared by a traditional ready-mix process.

7—During the finish process where bleed water is generally present, this process presented no bleed water. However, the surface remained moist. Unlike concrete prepared from traditional ready-mix products, the water, surprisingly, was retained within the concrete surface under conditions which would, with Readymixes in the absence of E5 INTERNAL CURE, likely give a much drier surface.

8—The team then spent 4 hours completing the concrete finishing process. Unlike concrete prepared from traditional Readymixes, the finishing process could be performed with the machines running at half throttle because of the moisture still present at the concrete surface. This led to a much easier finishing process than concrete without the E5 INTERNAL CURE. Traditional concrete requires machines to be run at a throttle of 100% and is a more labor-intensive process involving an increased risk of surface damage during finishing.

9—Abrasion Resistance of was measured by subjecting associated cylinders to ASTM-C944, and a loss of 1.1 grams was observed.

We claim:

1. A process for the preparation of a concrete installation, said process comprising the steps of:
   A) creating a concrete mix from components, said components comprising each of the following:
      a) a quantity of dry cement mix, said cement mix characterized by:
         i) a manufacturer suggested water/cement ratio value; wherein said suggested ratio falls in the range of from about 0.35 to about 0.65; and whereupon combination with b), the water/cement ratio is not greater than the value corresponding to about 30% greater than the suggested value;
         or
         ii) manufacturer suggested water/cement ratio range, having an upper value and a lower value, and whereupon combination with b) below, the actual water/cement ratio is less than the value corresponding to about 30% greater than the upper value;
         or
         iii) an amount such that, whereupon combination with b) below, the water/cement ratio is in the range of from about 0.35 to 0.65;
      b) a quantity of water,
      c) a quantity of amorphous silica of at least about 0.1 ounces per hundredweight of cement in a); wherein the average silica particle size is in the range of from about 1 to about 55 nanometers and/or wherein the surface area of the silica particles is in the range of from about 300 to about 900 m2/g;
      d) a quantity of aggregate and/or sand; and
   B) wherein the water of b) is added in its entirety or in portions comprising an initial portion, comprising at least about 20 wt % of the quantity of water, and a tailwater portion; wherein the initial portion of water is combined with a) and the components of d) to form a first mix; and wherein the amorphous silica is added to the first mix to form a second mix;
   AND
   wherein the tailwater is 1) added to the first mix or 2) added to the second mix; or 3) is co-added with the amorphous silica to the first mix, wherein the amorphous silica and the tailwater are, optionally, intercombined; and wherein 1) the first mix is agitated prior to the addition of the tailwater, after the addition of the tailwater, and after the addition of the amorphous silica or 2) the second mix is agitated prior to the addition of the amorphous silica, after the addition of the amorphous silica but before the addition of the tailwater, and after the addition of the tailwater; or 3) the second mix is agitated prior to co-addition of the amorphous silica and the tailwater, and whereupon the concrete mix is then agitated;
   OR
   C) wherein the quantity of water is added to a) and the components of d) to form a mix, whereupon said mix is agitated for a time ta prior to the addition of the amorphous silica, whereupon the concrete mix is then agitated;
   wherein, in the satisfaction of the constraints of B) or C), a silica-comprising mixture results from B) or C), said silica-comprising mixture is mixed for a time greater than about 5 minutes, at a mixing speed of at least 7 RPM;
   D) an admixture is added after step B) or step C) to form an admixture-comprising mixture, and said admixture-comprising mixture is mixed, for a total time of at least 3 minutes at one or more speeds greater than about 6 RPM;
   E) pouring the concrete mix of D) to form a concrete installation.

2. A process as in claim 1 wherein the initial portion of water comprises at least 30 wt % of the quantity of water.

3. A process as in claim 1 wherein the amorphous silica is added in an amount in the range of from about 2.5 to about 5.5 ounces per hundredweight cement.

4. A process as in claim 3, wherein the amorphous silica is added in an amount in the range of from about 3.5 to about 4.5 ounces per hundredweight cement.

5. A process as in claim 1, wherein the colloidal silica is added after the tailwater.

6. A process as in claim 1 wherein the concrete is poured into slab or a footing.

7. A process as in claim 1, wherein the process is conducted in a Ready-mix; wherein the tailwater is added to the first mix after the first mix is agitated at a speed in the range of from about 2 rpm to about 18 rpm for a time in the range of from 15 seconds to 5 minutes; wherein after the tailwater addition, the mix is agitated at a speed in the range of from about 5 rpm to about 18 rpm, for a time in the range of from about 1 minute to about 18 minutes, after which the silica is added, as colloidal silica, to the Ready-mix, and the mix is agitated for a time in the range of from about 1 to about 15 minutes at a speed in the range of from about 2 to about 18 rpm.

8. A process as in claim 1, wherein the process is conducted in a Ready-mix; wherein the tailwater is added to the first mix after the first mix is agitated at a speed in the range of from about 2 rpm to about 18 rpm for a time in the range of from 15 seconds to 5 minutes; wherein after the tailwater addition, the mix is agitated at a speed in the range of from about 5 rpm to about 18 rpm, for a time in the range of from about 1 minute to about 18 minutes, after which the silica is added, as colloidal silica, to the Ready-mix, and the mix is agitated for a time in the range of from about 1 to about 15 minutes at a speed in the range of from about 2 to about 18 rpm.

9. A process as in claim 1 wherein the admixture-comprising mixture is mixed for a time in the range of from about 5 to about 15 minutes at one or more speeds in the range of from about 7 RPM to about 15 RPM.

10. A process as in claim 9 wherein the admixture-comprising mixture is mixed for a time in the range of from about 5 to about 10 minutes.

11. A process as in claim 10 wherein the admixture-comprising mixture is mixed at one or more speeds in the range of from about 12 to about 15 RPM.

12. A process as in claim 11 wherein said silica-comprising mixture is mixed for a for a total time in the range of from about 5 to about 15 minutes.

13. A process as in claim 12 wherein said silica-comprising mixture is mixed for a total time in the range of from about 5 to about 10 minutes.

14. A process as in claim 13 wherein said silica-comprising mixture is A mixed at one or more speeds in the range of from about 7 RPM to about 15 RPM.

15. A process as in claim 14 wherein said silica-comprising mixture is mixed at one or more speeds in the range of from about 12 to about 15 RPM.

\* \* \* \* \*

UNITED STATES PATENT AND TRADEMARK OFFICE
CERTIFICATE OF CORRECTION

| | |
|---|---|
| PATENT NO. | : 11,866,366 B2 |
| APPLICATION NO. | : 16/602272 |
| DATED | : January 9, 2024 |
| INVENTOR(S) | : Dustin A. Hartman, William Archie Joseph Shetterley and Christopher F. Wolf |

It is certified that error appears in the above-identified patent and that said Letters Patent is hereby corrected as shown below:

On the Title Page

Please INSERT the following after the "(65) Prior Publication Data" section:
--(60) Related U.S. Application Data
Provisional application No. 62/765,597, filed on Sept. 1, 2018.--

Signed and Sealed this
Thirteenth Day of February, 2024

Katherine Kelly Vidal
*Director of the United States Patent and Trademark Office*